United States Patent [19]

Smith

[11] 4,114,017
[45] Sep. 12, 1978

[54] CORROSION-RESISTANT LIGHT-WEIGHT SPOT WELDING GUN

[76] Inventor: Adrian P. Smith, 51 Woodland Shore, Grosse Pointe Shores, Mich. 48236

[21] Appl. No.: 641,994

[22] Filed: Dec. 18, 1975

[51] Int. Cl.² .............................................. B23K 11/10
[52] U.S. Cl. ........................................ 219/90; 219/120
[58] Field of Search ......................... 219/90, 119, 120; 138/143, 195, DIG. 6; 122/DIG. 13

[56] References Cited

U.S. PATENT DOCUMENTS

| 149,138 | 3/1874 | Lansdell | 122/DIG. 13 |
|---|---|---|---|
| 2,249,937 | 7/1941 | Bohn | 219/120 |
| 2,351,230 | 6/1944 | Powell | 219/120 |
| 2,355,145 | 8/1944 | Carlson | 219/120 |
| 2,437,740 | 3/1948 | Haynes | 219/120 |
| 2,995,647 | 8/1961 | Bernard | 219/120 X |
| 3,376,461 | 4/1968 | Millward | 219/120 X |

FOREIGN PATENT DOCUMENTS

| 42-6046 | 3/1967 | Japan | 219/120 |
|---|---|---|---|
| 42-6047 | 3/1967 | Japan | 219/120 |

*Primary Examiner*—E. A. Goldberg
*Attorney, Agent, or Firm*—Willis Bugbee

[57] ABSTRACT

A light weight spot welding gun has an aluminum gun body with silver plated sockets for fixed and moveable electrodes. The body has cooling water passages communicating with the sockets. To prevent corrosion and clogging of the passages, the passages are nickel plated.

5 Claims, 5 Drawing Figures

CORROSION-RESISTANT LIGHT-WEIGHT SPOT WELDING GUN

BACKGROUND OF THE INVENTION

Aluminum and its alloys have come increasingly into use for the fixed jaw bodies and movable jaws of spot-welding guns because of their weight being only about one-third of copper from which previous welding guns were commonly made. Aluminum, however, is easily attacked by corrosive agents present in contaminated water with the result that the aluminum oxide powder resulting from corrosion of the aluminum clogs the water cooling passageways and causes failure of the welding gun. Aluminum castings provided with nickel tubes seated therein which were previously tried were found to fail when corrosion of the aluminum took place so that the tubes filled up with aluminum oxide powder and the brass water fittings came out taking portions of aluminum with them. Aluminum surfaces exposed to air also corroded to a lesser extent, but sufficiently to prevent good electrical contact between the aluminum and the adjacent electrical current conductor connected thereto.

SUMMARY OF THE INVENTION

The invention particularly resides in a corrosion-resistant nickel-plated aluminum or other light-weight metal spot-welding gun is exteriorly nickel-plated and is provided internally with cooling liquid passageways coated with nickel-plated layers for protection against corrosion by deleterious chemicals in the cooling-liquid such as water in both the fixed and movable electrode-carrying jaws. It also resides in the provision of silver-plated sockets in said fixed and movable jaws in which the rearward ends of the hollow fixed and movable copper spot-welding electrodes are mounted. It further resides in the provision of silver plated coatings on the surface or surfaces to which electrical contact is made by the current-carrying welding cable terminal to the fixed jaw, and through a flexible shunt and shunt adapter to the movable jaw, silver plating being used to enhance electrical conduction where the mutually-engaging parts are free from contact with water containing corrosive chemicals or are protected to a great extent by their tightly contacting engagement from air pollution corrosion.

Figure 1:
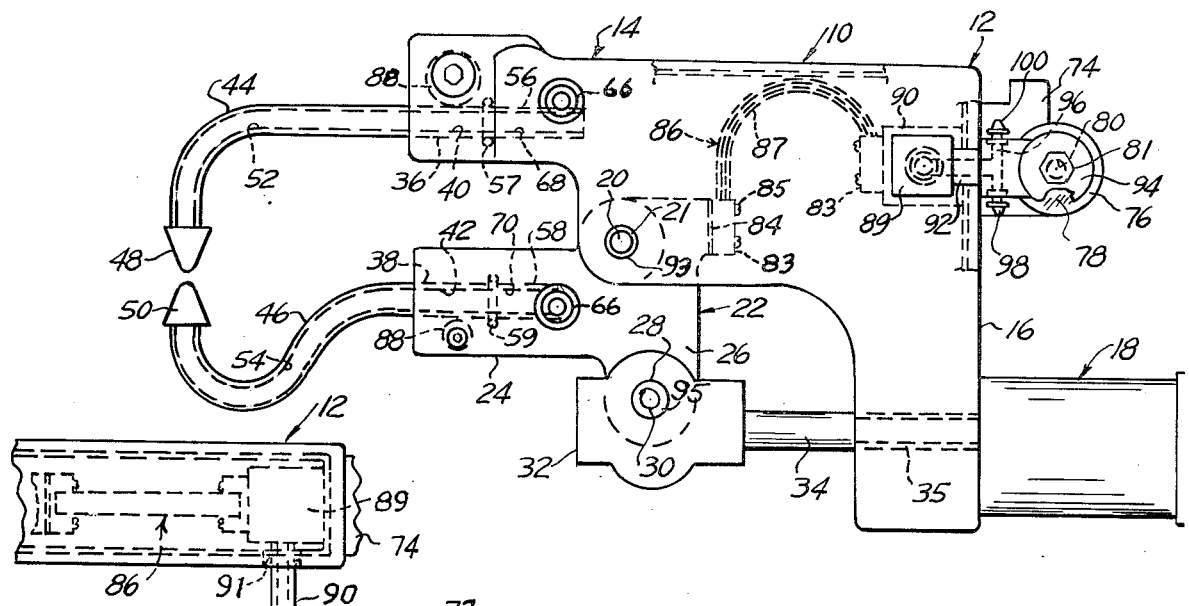
FIG. 1 is a side elevation of a corrosion-resistant light-weight spot-welding gun, partly in section in the upper right-hand corner, according to one form of the invention, with the connectors of the welding cable terminal omitted in order to reveal portions otherwise concealed thereby.

Referring to the drawing in detail, FIG. 1 shows a corrosion-resistant light-weight spot-welding gun, generally designated 10, according to one form of the invention, as consisting generally of an approximately L-shaped cast aluminum or other light-weight metal body 12 including a fixed electrode-carrying forward jaw 14 and a fixed cylinder-carrying rearward arm 16 for the mounting of a fluid pressure power cylinder or other reciprocatory motor 18. Pivotally mounted on the fixed forward or jaw-carrying arm 14 as by a pivot pin 20 in a bore 21 and electrically insulated therefrom by insulating bushings and washers 9 is an L-shaped movable electrode-carrying jaw of cast aluminum or other light-weight metal, generally designated 22, having a movable electrode-carrying forward arm 24 and a power-applying rearward arm 26 bored transversely at 28 to receive a similarly-insulated pivot pin 30 upon which the clevis 32 on the forward end of a piston rod 34 is pivotally mounted. The piston rod 34 passes through a suitable bore 35 in the rearward arm 16 of the body 12 into the fluid cylinder 18 where it is connected to a piston head (not shown) reciprocable therein. The cylinder 18 is connected in a conventional manner to a flexible conduit or conduits (not shown) leading to a source of pressure fluid by way of a suitable conventional fluid control valve (not shown).

Figure 4:
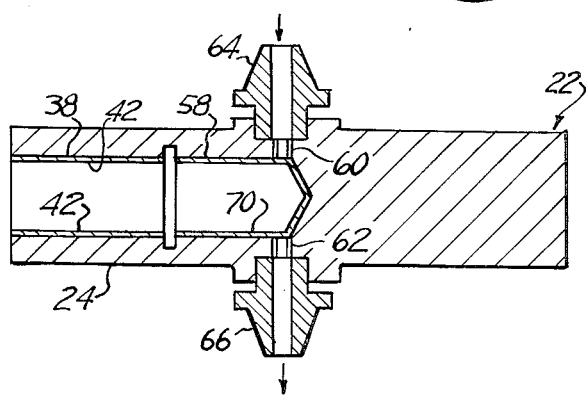
FIG. 4 is a horizontal section, taken along the line 4—4 in FIG. 2.

Both the fixed jaw 14 and the movable jaw 24 are bored to provide electrode sockets 36 and 38 respectively, provided with silver-plated coatings or layers 40 and 42 respectively, in which are clamped the rearward ends of hollow copper movable and fixed welding electrodes 44 and 46 respectively provided with fixed and movable tips 48 and 50 respectively. The electrodes 44 and 46 are provided with cooling liquid passageways 52 and 54 respectively which are annularly grooved at their forward ends to receive elastomeric O-rings 57 and 59 as seals, and communicating at their rearward ends with T-shaped cooling liquid passageways 56 and 58 respectively (FIG. 4). Each passageway 56 or 58 has a threaded cooling-liquid inlet port 60 and a threaded cooling liquid outlet port 62, each provided with a threaded hose connection fitting 64 or 66 respectively adapted to be connected to cooling liquid inlet and discharge hoses (not shown), the former of which are in turn connected to a source of cooling liquid, such as a water main. The cooling liquid passageways 56 and 58 are provided with nickel-plated coatings 68 and 70 respectively which provide protection against corrosion of the aluminum or other light-weight metal of the body 12 or movable electrode-carrying jaw 22 against corrosion by corrosive chemicals present in the cooling liquid. As stated above, the aluminum welding gun body 12 with its fixed jaw 14 and the movable jaw 24 are nickel-plated to protect them against corrosion from deleterious chemicals in the cooling liquid, such as water.

Figure 5:
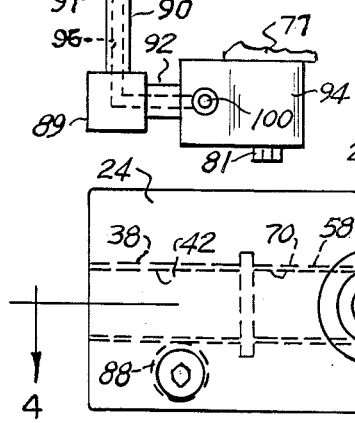
FIG. 5 is a fragmentary top plan view of the upper right-hand corner of FIG. 1, but with a portion of one of the connectors of the welding cable terminal added thereto.

The upper rearward corner of the light-weight metal body 12 (FIGS. 1 and 5) is provided with a rearwardly-extending boss 74 with a side face 76 covered with a silver-plated coating 78 thereon to insure good electrical contact with the conventional first terminal connector (not shown) projecting forward from the conventional terminal (also not shown) of a conventional two-conductor welding cable (likewise not shown). A portion 77 (FIG. 5) of the conventional second terminal connector of opposite polarity also projects forward from the welding cable terminal in spaced parallel relationship to the first terminal connector and is separated from it by a conventional insulating strip (not shown). Such welding cables and their terminals and terminal connectors are well known to those skilled in the electric welding art and therefore are believed to require no further description. As is also well know, the bolt 81 passing through aligned holes in the cable terminal connectors of opposite polarities and their insulting strip is also insulated therefrom and from a similarly-aligned bolt hole 80 in the boss 74.

Figure 2:
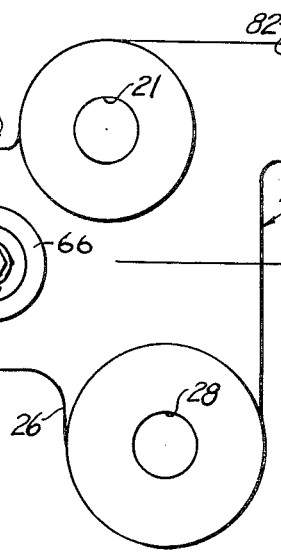
FIG. 2 is a side elevation, partly in section, of the movable jaw of the spot-welding gun of FIG. 1, detached therefrom but with cooling liquid hose connection fittings added thereto.
Figure 3:
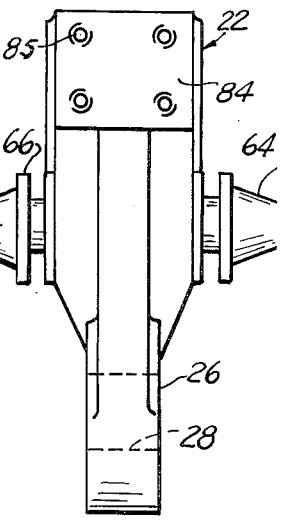
FIG. 3 is a rear elevation of the movable jaw shown in FIG. 2.

The movable jaw 22 at its rearward end adjacent the pivot pin 20 is provided with an electrical connection face 82 (FIGS. 2 and 3) which in turn is provided with a silver-plated coating 84 for improved electrical connection to a flexible shunt 86 of stacked thin flexible copper strips 87, the opposite ends of which are secured to lugs 83. The forward lug 83 is bolted to the connection face 82 of the movable jaw 22 by screws or other fasteners 85 threaded therein. The rearward lug 83 of the shunt 86 is similarly bolted to an L-shaped hollow shunt adapter 89, the forward arm 90 of which projects outward through the side wall of the body 12 (FIG. 5), from which it is insulated electrically by an insulating bushing 91. The rearward arm 92 of the shunt adapter 89 terminates in a generally annular head 94 which is also silver-plated on its inner face where it abuts the second terminal connector 77 and is held thereagainst by the electrically insulated bolt 81. The shunt adapter 89 has an angled and Tee-shaped nickel-plated cooling liquid passageway 96 therethrough terminating in cooling liquid inlet and outlet fittings 98 and 100 for the attachment of cooling liquid supply and discharge hoses (not shown).

The rearward ends of the welding electrodes 44 and 46 are detachably secured in their respective sockets 36 and 38 by so-called barrel locks 88. The bores 21 and 28 for the pivot pins 20 and 30 are provided with insulation 93 and 95 for insulating the movable jaw 22 and the clevis 32 from their respective pivot pins 20 and 30 and therefore insulating them from the body 12 and fixed jaw 14.

In the operation of the invention, let it be assumed that the passageways 56, if a shunt adapter (not shown) is employed, and 58 and, the port 72 are connected to cooling liquid inlet and outlet hoses attached to the fittings 64 and 66. Let it also be assumed that the terminal of the welding cable (not shown) has been bolted or otherwise attached through the bolt hole 80 to the silver-plated face 76 of the boss 74, also that the cylinder 18 has been connected to a source of pressure fluid. Thereafter, as the workman grasps the body 12 of the gun 10 and applies the electrode tips 48 and 50 to the spot weld location, he operates the pressure fluid control valve (not shown) to actuate the power cylinder 18 in such a manner as to move the piston rod 34 forward, causing the movable jaw 22 to swing around its pivot element 20 and bring the electrode tips 48 and 50 into contact with the workpiece. As a result, a spot weld is made. Meanwhile, the cooling liquid traverses the cooling liquid passageways 56 and 58, taking away the heat generated in the electrodes 44 and 46 by the weld. At the same time, the silver-plated layers or coatings 40 and 42 and the silver-plated face 78 respectively insure superior electrical contact at those locations, whereas the nickel-plated layers or coatings 68, 70, and 21 likewise insure freedom from corrosion resulting from attack of the aluminum or other light metal and consequently prevent the accumulation of the solid corrosion residues which would otherwise soon clog the aforesaid cooling liquid passageways.

It will be understood that the term "aluminum", as used herein, includes aluminum alloys, and that the term "copper", as used herein, includes copper alloys, such as bronze.

I claim:

1. A corrosion-resistant light-weight spot-welding gun, comprising an aluminum spot-welding gun body having a forward portion with a fixed jaw containing a fixed electrode socket and having a cooling water passageway communicating at its forward end with said fixed electrode socket and at its rearward end adapted to be connected to cooling water supply and discharge conduits, a movable aluminum spot-welding gun jaw movably mounted on said body and having a forward portion with a movable jaw containing a movable electrode socket and having a coolng water passageway communicating with said movable socket and at its rearward end adapted to be connected to cooling water supply and discharge conduits, said fixed and movable sockets being adapted to receive and hold hollow fixed and movable spot welding electrodes respectively communicating with said passageways, sealing means interposed between said sockets and said passageways for excluding water from said sockets, means on said body operatively connected to said movable jaw for moving said movable jaw toward and away from said fixed jaw whereby to move the welding electrodes into and out of welding engagement with a workpiece placed therebetween, a bipolar welding cable connection on said body adapted to be connected to the terminal connectors of an electrical supply welding cable, and means for conducting electricity of different polarities from said welding cable to said fixed and movable jaws respectively.

the internal surfaces of said cooling water passageways having nickel-plated corrosion resistant coatings thereon.

2. A spot-welding gun, according to claim 1, wherein said means for conducting electricity from said welding cable connection to said movable jaw include a shunt and a shunt adapter connected thereto and wherein a cooling water passageway is disposed within said shunt adapter, the internal surface of said shunt adapter passageway having a nickel-plated corrosion-resistant coating thereon.

3. A spot-welding gun, according to claim 1, wherein the internal surfaces of said welding gun body and said welding gun jaws also have nickel-plated corrosion-resistant coatings thereon.

4. A spot-welding gun, according to claim 1, wherein said cooling water passageway in said fixed jaw is approximately T-shaped, wherein said cooling water inlet and outlet connections are disposed at the opposite sides of said T-shaped passageway, and wherein said nickel-plated corrosion-resistant coating extends throughout the internal surfaces of said T-shaped fixed jaw passageway.

5. A spot-welding gun, according to claim 1, wherein said cooling water passageway in said movable jaw is approximately T-shaped, wherein said cooling water inlet and outlet connections are disposed at the opposite sides of said T-shaped passageway, and wherein said nickel-plated corrosion-resistant coating extends throughout the internal surfaces of said T-shaped movable jaw passageway.

* * * * *